UNITED STATES PATENT OFFICE.

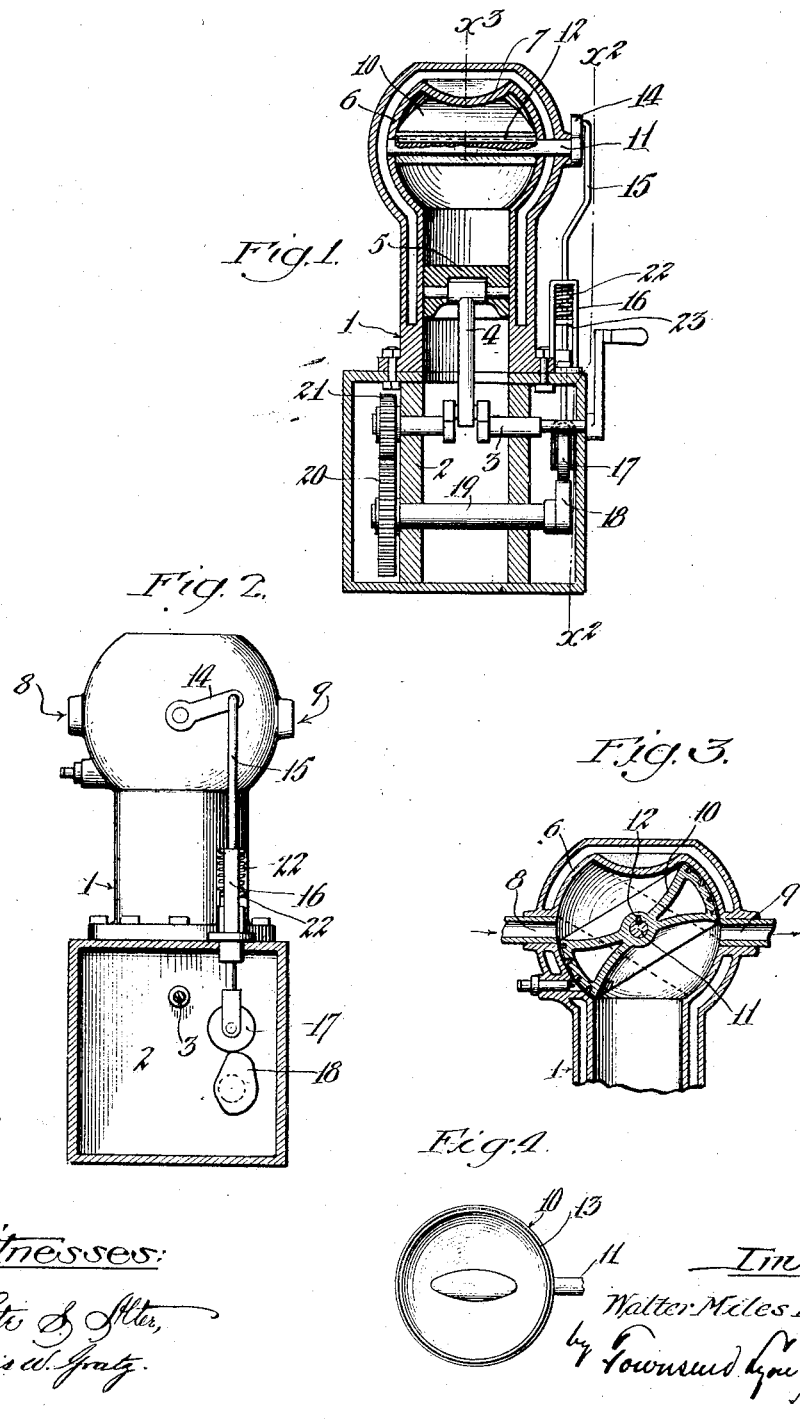

WALTER MILES LEEDOM, OF COLTON, CALIFORNIA.

RECIPROCATING GAS-ENGINE.

959,019.  Specification of Letters Patent.  Patented May 24, 1910.

Application filed January 14, 1908. Serial No. 410,761.

*To all whom it may concern:*

Be it known that I, WALTER MILES LEEDOM, a citizen of the United States, residing at Colton, in the county of San Bernardino and State of California, have invented a new and useful Reciprocating Gas-Engine, of which the following is a specification.

My invention relates to improvements in gas engines and the main object of the invention is to provide a novel form of valve for controlling the inlet and exhaust ports, whereby a single mechanism for actuating the valve will control the admission of mixture to the cylinder and also control the exhaust of the burned gas from the cylinder, thus obviating the employment of two valves and two valve operating mechanisms.

A further object is to provide a valve which is operated by rocking it, and a further object, also, is to so construct the rocking valve that a perfect fit between the valve and its seat is maintained at all times and to so construct the valve and its seat that leakage of gas past the valve is prevented at all points of contact between the valve and its seat.

I am aware that rocking valves have heretofore been employed for controlling the ports, but in such valves it was difficult to secure a close fit between the sides of the valve and the valve chamber, that is, between the sides of the valve which are at right angles to its axis. Furthermore, it was difficult in such valves to always maintain a good fit between the valve and its seat and difficult to take up wear. I overcome these difficulties by providing a spheral valve and a spheral valve chamber or seat, the valve having a face not only concentric with its axis, but being circular in a plane at right angles to its axis and every point on the face of the valve being located at an equal distance from a central point in its axis midway of the two ends of the axis, while the valve seat has a spheral concave face, all points of which are equidistant from the said central point of the axis of the valve. By reason of the spheral shape of the valve I am enabled to extend the packing rings circularly around the valve in planes parallel with its axis. With such a construction it is obvious that it is possible to perfectly pack the valve and prevent escape of gas around the same at all points. It will also be apparent that such a construction affords one in which the valve can be perfectly seated and always have a perfect fit with its seat irrespective of its position and which will also permit the valve to automatically take up wear. With this construction the strain of the pressure against the valve, which is produced by the explosion, is not borne entirely by the shaft which rocks the valve, but is borne by the seat of the valve.

Referring to the drawings: Figure 1 is a vertical section through an engine constructed with my invention. Fig. 2 is a section on line $x^2$—$x^2$ Fig. 1. Fig. 3 is a section on line $x^3$—$x^3$ Fig. 1. Fig. 4 is a plan view in detail of the valve.

1 designates the cylinder mounted on crank base 2, with crank shaft 3, connecting rod 4 and piston 5 operating in the cylinder 1. The upper end of the cylinder has a spheral head 6 which is in communication with the main body of the cylinder. The head 6 has a depressed upper portion 7 which reduces the volume of the head without interfering with the operation of the valve.

8 designates an inlet port and 9 designates an exhaust port, which ports are diametrically opposite in the head 6.

10 designates the valve which is spheral, as shown, and which is mounted on a rock shaft 11, the latter being journaled in the walls of the head 6 and the valve being secured on the shaft 7 by a feather 12 which permits longitudinal movement of the valve on its shaft, but causes the valve to turn with the shaft. The valve is thus allowed to automatically shift, longitudinally of the shaft 11 to take a proper seat in the head 6. The valve is provided with packing rings 13 which are circular and extend around the valve in planes parallel with the shaft 11, so that the entire contacting surface of the valve is provided with packing which prevents escape of gas past the valve. On the end of the shaft 11 is an arm 14 connected to a rod 15, the latter sliding in a guide 16 and carrying a roller 17 at its lower end which is actuated by a cam 18 on a cam shaft 19 operated by gears 20 and 21, arranged on the respective cam and crank shafts 19 and 3. A spring 22 acts against a collar 23 to depress the latter when permitted by the cam 18.

In Fig. 3 the valve is shown opening the exhaust port 9 to permit the exhaust gas to escape from the cylinder. At the end of the exhaust stroke the cam 18 will have passed the roller 17 which will permit the spring 22 to expand and move valve rod 15 to its lowest position, thereby rocking valve 10 into the opposite position, indicated by dotted lines in Fig. 3. During the next downward stroke of the piston the suction in the cylinder carries the mixture through the ports 8 into the cylinder under the valve 10 and at the conclusion of the intake stroke, the cam 18 will have again reached the roller 17 and will raise the valve 10 sufficiently to cut off both the inlet port 8 and exhaust port 9 very early during the compression stroke, so that as the piston moves upwardly the gas is compressed. Ignition takes place at the end of the compression stroke which forces the piston down through its working stroke and at the conclusion of the working stroke the cam 18 will raise the roller 17, thereby shifting the valve into the position shown in Fig. 3, permitting the exhaust. The exact shape of cam 18 will be determined by the width or area of ports 8 and 9 and by the width of the valve 10, and it revolves at one half the speed of the crank shaft. The cam 18 should be so shaped and timed that it will cause the valve 10 to close the inlet port 8 and exhaust port 9 very early in the compression stroke.

It will be noted that when the valve 10 is in mid position at the time of explosion the upper half of the head 6 acts to resist upward movement of the valve on account of the decreasing capacity of its concavity, so that the shaft 10 is relieved of the strain of the explosion. Moreover, the upward pressure at the time of explosion forces the valve more tightly in its seat thus preventing escape of gas past the valve. It will also be noted that by reason of the spheral convex shape of the valve and the spheral concave shape of the head, the valve is enabled to accommodate itself to its seat and take up wear.

What I claim is:

1. In a reciprocating gas engine comprising a cylinder having a spheral cylinder head provided with inlet and exhaust ports, a spheral valve fitting in said head, and valve operating mechanism.

2. In a reciprocating gas engine comprising a cylinder with a spheral head provided with inlet and exhaust ports, a shaft in said head, a spheral valve splined on said shaft and fitting the head, and mechanism for rocking said shaft.

3. In a gas engine comprising a cylinder with a spheral head of greater diameter than the cylinder and having inlet and exhaust ports, a spheral valve fitting in said head, and means for operating said valve to open and close said ports.

4. In a gas engine, a cylinder having a spheral head with inlet and exhaust ports located at diametrically opposite points of the head, a spheral valve in said head, and means for operating the valve to open and close said ports.

5. In a gas engine, a cylinder having a spheral head with inlet and exhaust ports, a spheral valve in said head, means for operating said valve, and circular packing rings in said valve lying in planes substantially parallel with the axis of the valve.

In testimony whereof I have signed my name to this specification in the presence of two subscribing witnesses.

WALTER MILES LEEDOM.

Witnesses:
WILLIAM C. FULLER,
M. F. CROPLEY.